United States Patent

Storch

[15] 3,690,231

[45] Sept. 12, 1972

[54] PHOTOCOMPOSITION ERROR CORRECTION SYSTEM

[72] Inventor: Leonard Storch, 175 W. 72nd St., New York, N.Y. 10023

[22] Filed: April 15, 1971

[21] Appl. No.: 134,217

[52] U.S. Cl. ....................95/4.5 R

[51] Int. Cl. ....................B41b 23/00

[58] Field of Search ....................95/4.5 R, 4.5 J

[56] References Cited

UNITED STATES PATENTS

| | | | |
|---|---|---|---|
| 2,790,362 | 4/1957 | Higonnet et al. | 95/4.5 R |
| 2,865,270 | 12/1958 | Higonnet et al. | 95/4.5 R |
| 3,339,470 | 9/1967 | O'Brien et al. | 95/4.5 R |

*Primary Examiner*—Robert P. Greiner
*Attorney*—Amster & Rothstein

[57] ABSTRACT

A photocomposing system wherein each character is assigned a character width as it is selected, with the character widths being accumulated in a line length memory as the line is composed to create a measure of the minimum length of the line, and with the minimum line length being deducted from the desired line length and the excess space distributed between words of the line to create lines of substantially uniform length, includes apparatus permitting errors in composition to be corrected on a word-by-word basis. The one word error system includes a word length memory for accumulating the widths of characters in each word including the width of the preceding word space as they are selected, with the word length memory being reset with the beginning of each word space. When an error in composition is detected in a word being typed, the word length memory is used to restore the line length memory to its condition prior to the previous word space, so that the errored word and space can be deleted and corrected without recomposing the entire line.

6 Claims, 2 Drawing Figures

10

Figure 1:
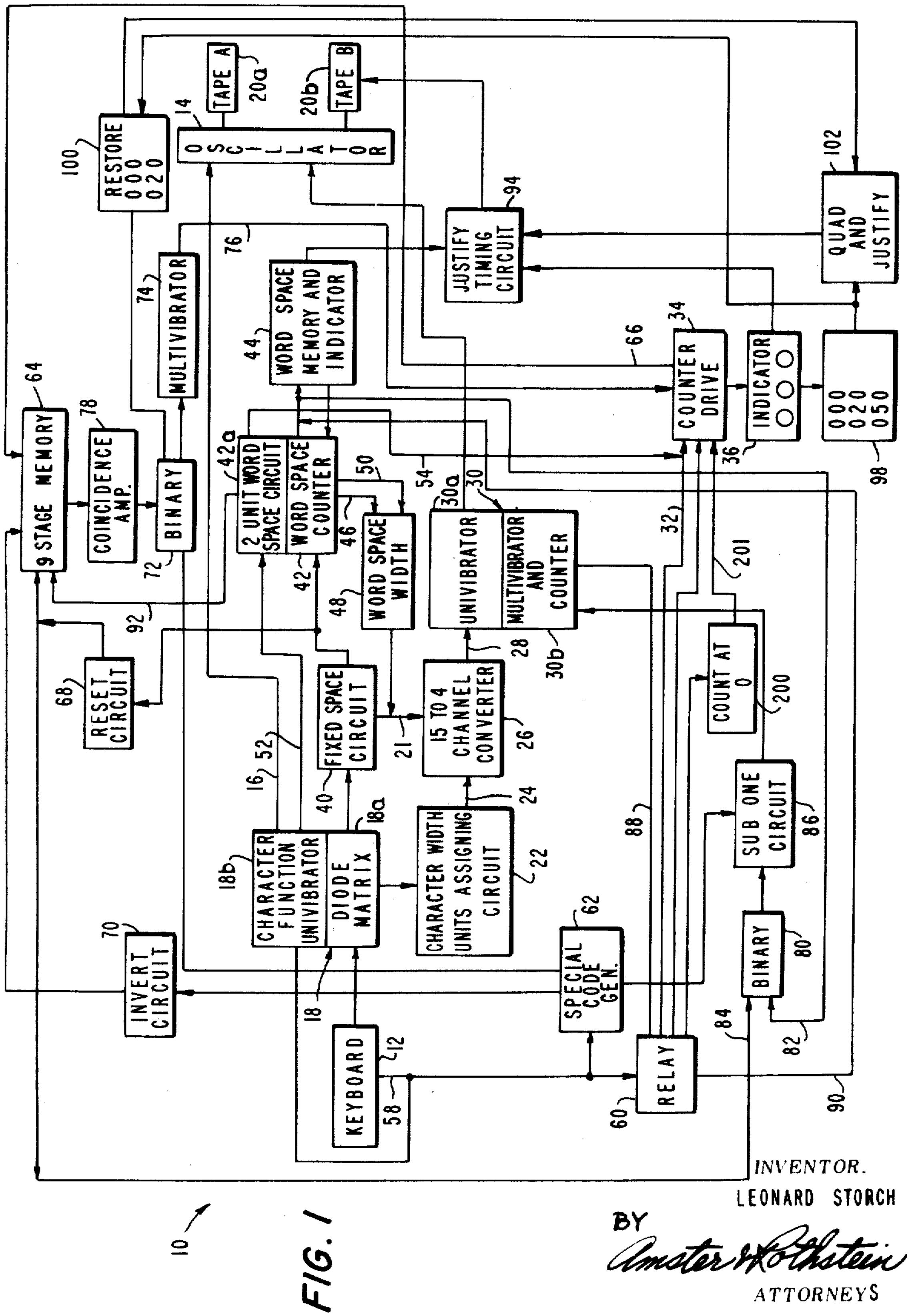

INVENTOR.
LEONARD STORCH

BY *Amster & Rothstein*
ATTORNEYS

INVENTOR.
LEONARD STORCH

BY
Amster & Rothstein
ATTORNEYS

PHOTOCOMPOSITION ERROR CORRECTION SYSTEM

This invention relates generally to the printing arts and more specifically to a photocomposing system permitting correction of composition errors on a word-by-word basis.

Broadly, photocomposing systems are used to assemble characters typed at a keyboard in proper form for printing on a sheet of photosensitive material which thereafter may be used to make a printing plate. An important function of most photocomposing systems is to "justify" each line of the text to be printed — that is, to arrange the spacing between words and/or letters of each line so that all lines in the composed text are of substantially equal physical length.

One preferred method of justifying line length involves assigning a predetermined character width to each character on the keyboard (including letters, numbers, symbols and normal spaces) as it is selected. Such character widths are most conveniently assigned in the form of width units, with each character or space being assigned a number of width units proportional to its physical width, but not exceeding 18 width units. Such a system is known as an 18 unit system. As a line of copy is typed on a keyboard, the character width units are accumulated and the number of word spaces in the line are counted. When the line is assembled on the photosensitive surface, the accumulated sum of character widths (which reflects the minimum possible physical length of the line) is automatically compared with the desired line length and the additional space necessary to bring the minimum line length up to the desired length is added in substantially equal parts between adjacent words in the line. A representative system for justifying line length in accordance with the above brief summary is disclosed for example in U.S. Pat. Nos. 3,044,374; 2,924,157; 2,905,068; 3,067,660 and 3,067,661.

In many photocomposing systems, including the system described in the above-identified patents, the photocomposing apparatus is divided into two parts. In the first, the letter selection from a character keyboard, including all information necessary to make the appropriate mechanical adjustments to justify the length of each line, is coded onto a magnetic or paper tape. In the second, the tape is played back on a photoassembling device, including flash lamps, shutters, a type font and other elements, which expose the photosensitive sheet in accordance with the instructions contained on the tape. The operation of this system in two parts permits the output of several composing machines to be assembled on a single photoassembling machine which is faster, but more costly. The present invention will be described principally in terms of this two part type system, with emphasis on the composing unit where the major portion of applicant's novel apparatus would normally be located. However, it is to be understood that applicant's invention is equally as applicable to a system which combines both the composing and photoassembling function in a single unit.

A basic difficulty with photocomposing systems of the type described above is that errors made while typing the characters of a line cannot be corrected unless the entire line is deleted and retyped. This is necessary because the information required to justify each line must be assembled on a line-by-line basis. When an error is noticed, the operator inserts a delete code on tape, which instructs the assembling machine to disregard the characters of the line. The operator must then type the line anew. Alternatively, provision may be made for errors to be deleted letter-by-letter. However, this requires that each letter be specifically retyped with the composing machine set in a special mode so that the justifying information is brought back to the mistake. This letter-by-letter cancellation system is almost as slow and cumbersome as retyping an entire line and frequently an operator will retype an entire line rather than delete letters one by one.

Further, in conventional systems, the minimum length of each line (the accumulated sum of the width of characters in each line) must not be longer than the desired length of the line. If at the end of a line it appears that the line includes too many characters, prior art systems required that either the entire line be canceled and retyped, or that each specific letter of the extra word be deleted in reverse mode until the line is within acceptable limits.

The necessity of retyping each line when an error is made causes a substantial waste of operator time and effort. Similarly, the retyping of each letter in a reverse mode requires specific operator attention and effort and cannot be accomplished in the normal course of typing.

It is a basic object of the present invention to improve photocomposing systems of the type described above by making such systems faster and more efficient.

It is a further object of the present invention to provide a photocomposing system wherein an operator may correct errors on a word-by-word basis without recomposing an entire line and without correcting specific letters on a letter-by-letter basis.

It is a further object of the present invention to provide a photocomposing system wherein a word at the end of a line found to be overly long may be easily deleted and retyped on the next line or in hyphenated form as appropriate.

In accomplishing these and other objects and in accordance with the present invention, a photocomposing system which adjusts the spaces between words in each composed line to create a desired physical line length, includes means for sequentially selecting characters to be composed, a minimum line length memory for accumulating the width of all characters and normal spaces as they are selected, a word space counter recording the number of word spaces in a line, a word length memory for accumulating the sum of character widths in each word as it is typed, the word length memory being reset with the beginning of each word space, and means operable upon recognition of an error in composition for adjusting the minimum line length memory in accordance with the word length memory to restore the line length memory to its condition immediately preceding the incorrectly typed word and its preceding word space, so that the errored word may be deleted and retyped in a normal operating mode without retyping the entire line or deleting specific letters on a letter-by-letter basis. It will be apparent that applicant's system is also useful when the apparatus is used in a non justifying mode to permit more convenient correction of errors.

Figure 2:
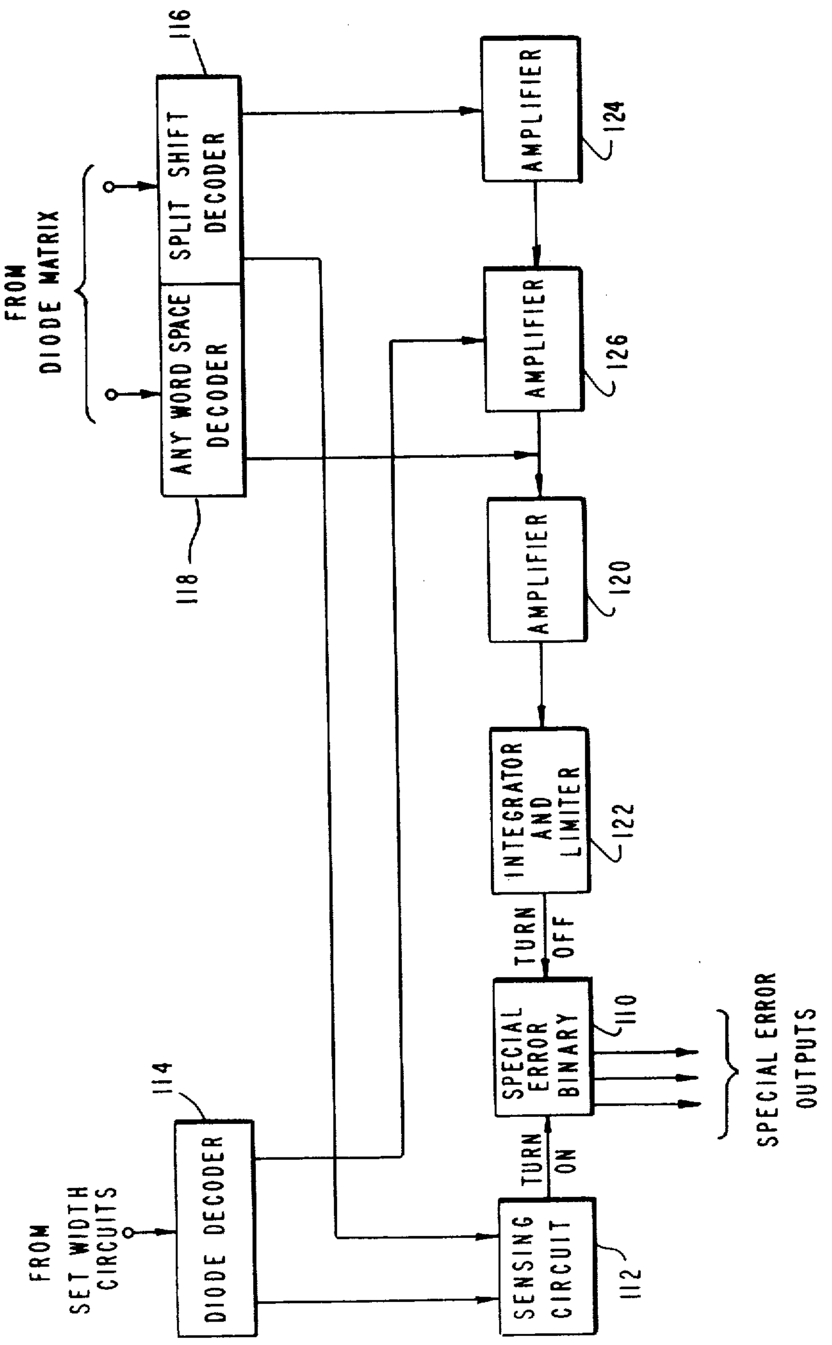

Further objects, features and advantages of the present invention will be appreciated by reference to the following detailed description of a presently preferred but nonetheless illustrative embodiment thereof, when taken in conjunction with the appended drawing wherein:

FIG. 1 is a block schematic diagram of the composing portion of a photocomposing unit incorporating the present invention; and FIG. 2 is a block schematic diagram of a modification of a conventional assembling unit for use in accordance with the invention.

For convenience, the preferred embodiment of the present invention will be described in the context of the photocomposing system disclosed in the above-identified Friedman patents. The reader is referred to these patents for further details of this type of photocomposing system which are not directly relevant to the improvement of applicant's novel system and which are hence not described fully herein. It is to be understood that the present invention is applicable to all photocomposing systems wherein line length is justified in the manner described fully above.

The composing portion 10 of applicant's system generally includes a keyboard 12 which is preferably part of a specially adapted typewriter providing both input signals to the photocomposing system and a typed copy of the text being composed. The typewriter permits an operator to sequentially select the characters to be assembled for printing in normal typing fashion and to see and read the text as it is prepared. In addition, the typewriter has auxiliary controls to provide all the special mechanical functions which are required for photocomposition as opposed to normal typing. These auxiliary controls will be described below only as they become significant to the operation of applicant's novel system.

Operation of the typewriter keyboard 12 activates a coding system including diode matrix **18*a* and character function univibrator 18*b* wherein the selection of each letter at the typewriter is converted into a unique code which is applied on channel 16 to an oscillator 14 which drives recording heads 20*a* and 20*b*** to apply the code on magnetic tape (not shown) which records the unique code for each letter. When the tape is played back on a photoassembling device such as that shown in U.S. Pat. No. 3,044,374, each unique code will activate an appropriate illuminating system and shutter system to expose the letter selected on the typewriter at a desired location on a sheet of photosensitive material. The photoassembling device is designed to properly position the photosensitive material with respect to the illuminated letter so that the desired text layout is achieved.

In addition to this basic function, composing unit 10 is designed to measure the minimum length required for each line of text and to record, usually on a second channel on the magnetic tape, sufficient information to permit the photoassembling portion of the system to automatically adjust the spacing between letters and words of each line to produce words of attractive appearance and lines of substantially equal physical length.

The spacing of the letters of each word is accomplished by assigning to each character as it is selected on the typewriter a character width measure, preferably in the form of a number of standard width units. This character width assignment is performed by circuit 22, the specific design of which is described in the foregoing Friedman patents. This character width measure is then converted into a code which is similarly recorded on a second tape channel on the selection of each character in a manner to be described below. This code will be read by the photoassembling apparatus which will advance the photosensitive material by an amount proportional to the desired width of the letter before the letter is exposed. It is to be understood that this letter width code need not be placed directly on tape each time a character is typed. Rather, the photoassembling unit may be advanced in accordance with a character width assigning circuit contained by the photoassembly unit itself.

To establish proper spacing between the words of each line so that all lines are of substantially equal length, applicant's system accumulates the character width of all characters selected in each line and is adapted to be preset with a measure of the desired line length. Simultaneously, the composing apparatus 10 keeps a running count of the number of word spaces in each line. At the end of the line, appropriate codes are placed on the magnetic tape by tape head **20*b*** to inform the photoassembling machine of the difference between the actual minimum length of the line (the accumulated sum of character widths in the line) and the desired length of the line, and of the number of word spaces in the line (a word space is the space between two adjacent words). In the system described in the Friedman patents, the photoassembling device reads and assembles the magnetic tape backwards, thus reading the justifying information before the text that is to be assembled. Upon reading this information, the photoassembling device calculates how many additional standard width spaces must be added between words of the line in order to make the line come out to the desired length. As the photocomposing apparatus continues to read the tape and expose the letters from the tape onto the photosensitive sheet, it automatically adds the extra calculated space between each word so that the line lengths remain uniform.

As shown in the drawing, character width assignor 22 receives signals from diode matrix **18*a* indicating which character has been struck and converts these signals into a selected code which is transmitted by a 15 channel connection 24 to a 15 to four channel converter 26 where it is connected to a binary code on four channel connection 28 and is applied to circuit 30 which consists of univibrators, a multivibrator, counter stages and control circuitry. Circuit 30 converts the four channel binary code into a sequence of digital pulses equal to the number of standard width units to be associated with the character selected. The pulse train is applied from multivibrator 30*b* along channel 88, through relay 60 which normally closes channel 88 to channel 32 and through channel 32 to a counter drive circuit 34, which drives a counter indicator circuit 36. Counter indicator circuit 36 may be in the form of a NIXIE tube display of a type well known in the art as is drive circuit 34. Counter drive 34 and counter indicator 36 together provide the function of line length memory in that the counter indicator is augmented by a number of pulses corresponding to the width of each letter as the letter is depressed at the keyboard. At the same time, the univibrator circuits 30***a* apply specific codes on channel 38 to oscillator 14 at the tape unit to indicate to the photoassembling device how many spaces it must leave for each letter as the letter is exposed as described above. Counter drive indicator circuit 34, 36 thus accumulates the total number of width measures in each line as it is composed. On completion of each line, the counter-drive circuit 34, 36 is reset to its start mode.

Preferably counter circuit 36 simultaneously provides an operator with a usual indication of the number of space units remaining for composition. To this end, counter 36 is preferably reset to the maximum length of the line and counts downward, thereby always indicating the amount of space remaining in the line.

Simultaneously with the accumulation of this line length information, the keyboard includes a space bar which is depressed by the operator between each word of the text. Each time the space bar is depressed, word space circuitry 42 is activated and a selected number of width units are added to the counter circuit 34, 36 by multivibrator 30*b* and a word space code is applied to the tape. The amount of space provided for the word space may be selected in advance by the operator. This selected width will be the minimum space between words on the basis of which the minimum line length is calculated. Additional space may be added between words in accordance with the calculations referred to above.

The word space circuit (described below) is also adapted to apply a fixed space of any desired number of width units at any point in the line, either between words where extra spacing is desired for appearance, between letters, numbers, etc. To accomplish this, the output of diode matrix 18*a* first passes through a fixed space circuit 40, which is connected by channel 21 directly to 15 to four channel converter 26 which feeds univibrator-multivibrator 30. This circuitry is arranged so that an operator may select any number of character width units as a fixed space and depress the appropriate control thus adding any desired number of character width units at any point in the line, both to the counter indicator 36 and to the tape.

When the normal word space circuit is not in the special configuration described above, the word space signal passing through circuit 40 is applied to word space counting circuit 42. Associated with counting circuit 42 is a word space memory and indicator circuit 44 which has a binary indicator as opposed to a digital indicator. When a normal word space signal is received from diode matrix 18*a*, word space counter 42 increments word space memory circuit 44 by a single unit. At the same time, a signal is generated along channel 46 to word space width circuit 48 which operates circuit 30 through converter 26 so as to apply a preselected minimum number of space units to indicator 36 and to oscillator 14. It is to be understood that the normal minimum word space widths assigned by circuit 48 is selected before a particular composing job is commenced and the composing apparatus is set accordingly.

Many photocomposing machines, including the system disclosed in the above-identified patents, are not capable of justifying a line containing more than a fixed number of word spaces. In the case of the Friedman machine, 15 word spaces can be accommodated. However, a line may include more than 15 word spaces. In such circumstances, a fixed value space is inserted between words, which fixed value space is not augmented in the justifying process. This sometimes leaves the relative spacing between the last words of a line different from the relative spacing between the prior words of a line. However, this slight variation is acceptable. 74.

In the present system, the circuitry employed to solve this particular problem is disclosed in view of the fact that applicatn's novel system, as applied to the Friedman Photocomposing System, must make allowances for this peculiarity. Specifically, when word space counting circuit 42 receives a word space signal from the diode matrix 18*a*, it tests the condition of word space memory 44. If word space memory 44 has less than 15 units already accumulated, it operates in the manner described above to increment the word space memory and to communicate the desired minimum spacing to indicator 36 and to the tape. When a word space signal is received in counter 42 and word space memory 44 has already counted to 15, word space counting circuit 42 does not send the usual signal on channel 46, but rather applies a signal on channel 50, which instructs circuit 48 to insert a fixed space on the tape proportional to the minimum word space chosen for the job. This signal is passed from circuit 48 to the converter, univibrator-multivibrator and counter-indicator in the same manner as previously described.

A second idiosyncrasy of the system of the above patents is also shown herein so that applicant's novel system can be adequately disclosed in this environment. Specifically, the operator selects (before commencement of the composing job) the minimum desired width of each word space (it being understood that that width will then be augmented in accordance with the justifying information). This width may be selected as 2, 4, 5, 6, etc. standard width units. However, because of the limitations of the width counting circuits in the Friedman system, it is not possible to select a two unit word space through the 14 to four channel converter 26 because it must count a minimum of four units). Accordingly, a separate channel 52 is activated when a two unit minimum word space width is desired. The channel communicates directly with a separate two unit word space section 42*a* of circuit 42 which communicates directly through channel 54 with the counter-drive circuit 34 to apply two units on the occurrence of each word space when this spacing is selected. At the same time, section 42*a* augments word space memory 44 by a single unit each time a word space is selected in a normal manner.

Thus far, only the conventional elements of applicant's photocomposing system have been described. In operation of the system as described thus far, it would be necessary on detecting an error in composition (for example, the typing of an incorrect letter) to delete the entire line by placing a delete code on tape instructing the assembling apparatus to disregard the line, recycling all counters to zero and typing the line anew. The necessity of retyping entire lines to correct an error in a single word is wasteful of operator time and effort and of machine time. Applicant has found that substantial operator effort can be saved correcting errors on a word-by-word basis.

To delete one word at a time, applicant's system is adapted to place a special code on tape instructing the assembling apparatus to disregard only the letters of the foregoing word (i.e., all characters back to and including the last word space) and to recycle indicator circuit 36 and word space memory circuit 44 to take into account removal from the line of the errored word. The one word error cancellation circuit is activated by operation of a special one word error button on keyboard 12. This control applies a one word error signal to channel 58 and communicates with univibrator **18*b* to place an appropriate delete code on tape and with relay 60 and special error code generator 62 to operate the recycling system to correct memory 44 and indicator 36**.

In order to recycle the indicator 36, applicant's system includes a word length memory circuit 64 which is interconnected with counter-drive circuit 34 by channel 66. Each time counter-drive circuit 34 is activated, incrementing indicator 36 by a single unit, word length memory 64 is similarly incremented. Memory 64 is preferably a conventional binary electronic memory unit of a type well known in the art. In the presently preferred embodiment of the invention, memory 64 has nine binary stages permitting a count of from zero to 512 units.

Word length memory 64 is adapted to be reset on completion of each word and, for this purpose, a word length memory reset circuit 68 is adapted to receive signals from the channel between fixed space circuit 40 and word space circuit 42. Word length memory 64 is thus augmented by a number of standard width units equal to the number of units in each character as it is typed and accumulates these width units until completion of the word is signaled by depression of the word space. At this time, memory 64 is reset by circuit 68 in condition to begin counting again for the next word space and word.

Upon recognition of an error in the composition of a word, as for example on recognition that an incorrect letter has been typed, applicant's system is adapted to adjust the indicator circuit 36 by a number of width units equal to the number of units already accumulated in memory 64, thus recycling circuit 36 to its condition prior to commencement of the errored word. This is accomplished by reversing counter 34 under control of relay 60 through channel 201 and circuit 200, adjusting the counter by a number of units equal to the number of units stored in word length memory 64 at the time the error was recognized. Circuit 200 is necessary because during this recycling, indicator 36 must increment the tens counter when the units counter reaches "0," not when it leaves "0" as in normal operations. The same applies when the tens counter reaches "0" with respect to the hundreds counter. At the same time, if the condition of word space memory 44 was such that the errored word space incremented memory 44, the word space memory 44 must be decreased by a single unit so that all control data for the justifying process will be recycled to its state immediately prior to commencement of the errored word.

In accordance with the preferred method of recycling indicator 36, special code generator 62 activates invert circuit 70 which inverts memory 64 in a well known manner. Inversion of memory 64 merely inverts the binary codes stored in the memory by converting each "on" cell to its "off" condition and converting each "off" cell to its "on" condition so that if memory 64 is driven further in the inverted mode it will reach a full condition when the number of pulses added equals the number of pulses which were recorded in the memory prior to reversal.

At the same time, special code generator 62 activates a binary switch 72 which allows operation of a multivibrator 74. Multivibrator 74 generates a continuous series of pulses which are applied along channel 76 to counter-drive 34. Since counter-drive 34 is at this time in a reverse counting mode (by operation of relay 60 and circuit 200), the pulse train for multivibrator 74 drives indicator circuit 36 in a direction opposite to its normal direction of operation, i.e., upwards as it normally counts downwards, thus replacing word space and character width units which had previously been used by virtue of the assembly of the errored word.

Just as counter-drive 34 drives memory 64 through channel 66 when in its normal operating mode, counter-drive 34 similarly drives memory 64 when it is activated by the pulse stream from multivibrator 74. Each step of counter-drive 34 applies a corresponding pulse through channel 66 to memory 64, which continues to increment. Since memory 64 is in an inverted mode, the number of pulses required to fill memory 64 is exactly equal to the number of pulses recorded in memory 64 at the time the memory was inverted, in accordance with well known binary memory practices. Multivibrator 74 thus continues to operate, driving indicator 36 (in a reverse direction) and incrementing memory 64 until memory 64 reaches its maximum count or full condition. This condition is sensed by coincidence amplifier 78 in a manner well known in the art. Amplifier 78 shuts off binary switch 72, thereby terminating the operation of multivibrator 74.

In summary, operation of binary control 72 commences operation of multivibrator 74 which drives counter-drive 34 in a reverse direction by virtue of relay 60 and circuit 200 increasing indicator 36 and simultaneously incrementing inverted memory 64 until memory 64 reaches its full condition which is detected by coincidence amplifier 78, shutting off binary 72 and multivibrator 74. Since the number of pulses required to drive memory 64 to its full condition is equal to the number stored in memory 64 at the time it was reversed, which number is equal to the number of character width units generated by the composing system since commencement of the errored word and word space indicator 36 will be recycled to its condition prior to commencement of the errored word. The accumulated character widths (used at the end of each line to justify line length) has thus been recycled to disregard the errored word, which may then be retyped correctly.

At the same time, if the errored word increased the count in word space memory 44, it is necessary to decrease this memory by a single unit to reflect the fact that the space representing the start of the errored word is no longer to be taken into account by the photoassembling device in calculating appropriate justifying information. To reset memory 44 only in appropriate circumstances, applicant's system must first detect whether memory 44 was in fact incremented at the beginning of the errored word — i.e., whether the word space at the beginning of the errored word occurred prior to the first 15 word spaces of the line.

This condition is detected by binary control 80 which is adapted to assume either an on or off condition under control of signals on channels 82 and 84 — a signal on channel 82 operating to place binary 80 in its on condition while a signal on channel 84 places circuit 80 in its off condition. Controls of the type suitable for use in this manner are well known in the electronic component arts. This is possible because the signal on channel 82 used to turn binary 80 on occurs milleseconds after the signal on 84 turns binary 80 off.

Binary 80 is turned on by channel 82 each time a signal passes between word space counting circuits 42 and word space memory 44. Thus, circuit 80 is turned on on the occurrence of each word space which increments memory 44, i.e., on the occurrence of each of the first 15 word spaces in a justifying line. Circuit 80 is turned to its off condition by a signal on channel 84 each time memory 64 is reset by circuit 68. Thus, binary 80 is turned to its off condition upon the occurrence of each word space, whether or not the word space is used to augment memory 44. Circuit 80 thus itself functions as a brief memory in that after a word space is signaled, control 80 will remain on during the typing of the succeeding word if that word space was used to increment memory 44, but will be off if that word space was used to generate a fixed value space and not used to increment memory 44.

If binary 80 is on (indicating that memory 44 must be adjusted), it is necessary to delete a single count from memory 44. In accordance with the preferred embodiment of applicant's invention, this is done by adding to memory 44, a number of units equal to the maximum number of units which the memory is adapted to accept, thus driving memory 44 through its full condition to a condition recording one unit less than the count on occurrence of an error. Stated differently, rather than subtract a single unit from the 16 space memory, applicant's system drives the memory by 15 spaces upward through 15 and through zero to a number one less than the number recorded on detection of the error. To accomplish this, special code generator 62 signals a control circuit 86 on operation of the error code to make the appropriate adjustment to memory 44. Circuit 86 is operative only if binary control 80 is in on condition (i.e., if the last word space typed in fact incremented memory 44). If binary 80 is in its off condition, the signal applied to circuit 86 from error code generator 62 has no effect. If 80 is in its on condition, circuit 86 instigates operation of the multivibrator section **30*b* of circuit 30 which is at this time converted to drive memory 44 through relay 60. Circuit 30 is used merely for convenience since it is otherwise inactive at this time. Use of this circuit saves applicant the necessity of including totally distinct multivibrator and counter stages in the circuit. Subtracting one from the word space memory and indicator, 44** could also be accomplished by inverting the counter, driving it one step and then inverting it again in a known manner. It is to be understood that applicant's invention contemplates the use of independent circuitry, if desired.

In order to use circuit 30 for this special purpose without simultaneously increasing indicator 36 through counter-drive 34 and without applying a unit measure to tape, counter multivibrator **30*b* is removed from its normal position in the circuit by relay 60 whenever the error button is depressed. Relay 60 breaks channels 88 and 32 which normally communicates the output of counter multivibrator 30*b* to counter-drive 34 and applies this output through relay 60 along channel 90 to the input of word space memory 44. Multivibrator 30*b* applies only 15 pulses to memory 44 (under control of circuit 86) thus having the effect of decreasing the number accorded in memory 44 by a single unit. When the special error button is released, relay 50 returns to its normal rest position closing channels 88 and 32 between multivibrator 30*b* and counter-drive 34 and returning counter-drive 34** to its downward counting mode and returning applicant's composing apparatus to its normal operating condition.

As applied to a photocomposing apparatus of the type described in the above referenced patents, applicant's system must make special provision for the recycling of indicator 36 when the system is in its special mode to operate with a two unit width word space. In normal operation of applicant's novel system as described above, the two units which are applied along channel 54 at each word space to counter-drive 34 and which increment indicator 36 by two units should similarly increment memory 64 after it is reset. However, incrementing of memory 64 is interfered with in this mode by the timing of reset circuit 68, in that the generation of the first pulse along channel 66 from counter-drive 34 arrives at memory 64 at the same time as the reset pulse arrives at circuit 68 so that memory 64 is in process of being reset at the time the first pulse is received. Accordingly, if special arrangements were not made, memory 64 would lose the first pulse of the two pulse word space thereby incrementing memory 64 by only one unit, when two units should have been added. To avoid this problem, applicant has provided an independent channel 92 from the two unit word space section **42*a* of circuit 42 directly to memory 64. This channel 92 reads the trailing edge of the word space pulse to circuit 42*a* and uses this edge to increment memory 64 by a single unit. Memory 64 is then incremented by a single unit through the normal operation of counter-drive 34 and a single unit by channel 92, recoding two units in memory 64** on occurrence of each word space in the word space two mode.

Depression of the special error button has thus recycled indicator 36 to its condition prior to commencement of the errored word and has recycled memory 44 (when appropriate) to account for the deleted word space. On completion of each line, word space memory 44 and indicator 36 are "read" by a justifying circuit 94 which applies the appropriate justifying codes to channel B of the tape by tape head **20*b*. This is accomplished by providing on tape at the end of each line distinctly timed intervals which can be read and distinguished by the photoassembling apparatus. In the first timed interval, the line length indicator 36 is incremented downward until it is in its zero condition. With each unit, a single pulse is applied to tape in the first timed interval, so that the first timed interval contains a number of pulses equal to the number of width units remaining in indicator 36 upon completion of the line to be justified. During the second timed interval, the word space memory 44 is similarly cleared onto tape so that the number of pulses on tape in the second timed interval represents the number of word spaces accumulated in memory 44. The photoassembling apparatus, which reads backwards, may then read the number of word spaces in the line and the number of width units which must be added between words so that these units may be evenly distributed to create a properly justified line. This aspect of the normal operation of this system is described in the above referenced patents. When the number of width units required to be distributed is not an even multiple of the number of word spaces available for distribution, the width units are assigned so that the unequal remainder is added to the first word spaces — i.e., the character width units are added to the word spaces one at a time starting from the first word space to the last word space, so that, for example, if there are 54** width units to be distributed and 10 word spaces to which they must be distributed, the first four word spaces starting from the right side of the line would include six width units and the remaining six word spaces would each include five width units. This slight irregularity is generally not noticeable in the assembled line.

One final peculiarity of the system described in the above referenced patents must be referred to. This system includes a sensory circuit 98 which takes special account of the condition when indicator 36 reaches 50 units, 20 units and 0 units remaining. The specific purpose of sensing these conditions on the line end is not important for an understanding of applicant's invention. However, in the operation of applicant's system as described previously, it will sometimes occur that the photocomposing apparatus has passed through the 50, 20 and possibly 0 indicator conditions prior to operation of the special error button. In this case, it is necessary to restore the circuitry operative on these conditions to their status as if these conditions had not been passed, so that the steps set to occur at these conditions will occur when the errored word is retyped. To accomplish this, operation of binary control 72 activates a restorative circuit 100. If, on operation of binary 72, the circuit 98, which normally senses the 50, 20 and 0 conditions has been activated, restore circuit 100 will be in an on mode so that operation of binary 72 will restore the control circuitry 98 and 102.

FIG. 2 shows a preferred embodiment of the modification required in a conventional photoassembly unit to permit one word error correction in accordance with applicant's invention. It is to be understood that numerous different modifications of the conventional assembling unit are possible to accommodate applicant's novel system and that several such modifications will be apparent to those skilled in the art. However, FIG. 2 shows a unique and presently preferred modification particularly applicable to the system of the above referenced patents.

The heart of the preferred modification is a special error binary unit 110, the output of which communicates with conventional circuitry in the assembling device to produce a delete condition. The special error binary is turned on by sensing circuit 112 which is responsive to a code otherwise unused in the system — namely the "split shift only" code with no set width code. The inputs to sensing circuit 112 are derived from the decoder 114 used to sense any set width and the split shift decoder 116. When the special error binary is activated, the assembling unit is put into its delete condition and the letter information read immediately thereafter is not assembled. This condition remains in operation until special error binary 110 is turned off.

Binary 110 must be turned off when the decoding unit senses the end of the errored word and its associated word space or other spacing unit. Accordingly, when the decoder 118 senses any word space, it applies a signal to amplifier 120 through circuit 122 to turn off the special error binary 110. Similarly, special error binary 110 is turned off when the unit senses the split shift code with any set width code, permitting the system to backspace to a fixed space code when appropriate. Thus, split shift amplifier 124 communicates with set width amplifier 126 which receives signals from the set width sensing circuit 114. The simultaneous occurrence of a split shift code and any set width operates amplifier 120 through circuit 122 to turn off special error binary 110. FIG. 2 thus shows a simple method of adapting the photoassembling unit described in the above-identified patents, making use of code combinations which are otherwise inoperative in that equipment.

Applicant has thus disclosed a unique photocomposition system which is capable of automatically correcting one word at a time. It is to be understood that the above-described arrangements are merely examples of the principles of the present invention as applied to a specific prior art system. Numerous additional embodiments will be obvious to those skilled in the art without departing from the spirit and scope of the present invention as defined in the following claims.

What is claimed is:

1. A photocomposing system for assembling copy in lines of substantially uniform length comprising means for sequentially selecting the characters to be composed, each of said characters having an associated character width, counting means receiving signals from said selecting means for accumulating the sum of said character widths to create a measure of the minimum length of each line as it is composed, memory means for accumulating said character widths in each word of said line, said memory means being incremented by the width of each character on selection thereof and being reset upon initiation of each word space, and means operative upon occurrence of an error for adjusting the sum of character widths in said counter in accordance with the sum of character widths in said memory to restore said counter to its condition immediately proceeding commencement of the errored word and its preceding word space, so that said error can be corrected by deleting and reselecting the characters of said word without deleting and reselecting all characters of said line.

2. Error correcting apparatus for use in photocomposing system having a keyboard for sequentially selecting characters forming a text to be composed, each character having a preselected character width, means for accumulating said character widths as said characters are selected to create a measure of the minimum length of each line as it is composed and means for justifying each line by adjusting the spaces between words of said line in accordance with the minimum length of said line and the desired length of said line, said error correcting apparatus comprising a memory communicating with said keyboard for accumulating the widths of characters in each word as the characters of said word are selected, said memory being cleared on initiation of each word space, and means for adjusting the measure of the minimum length of said line in said accumulating means in accordance with the accumulated widths of said characters in said memory on the recognition of an error in the composition of a word whereby the characters of said word may be deleted and reselected without reselecting the characters of an entire line.

3. A photocomposing system comprising a keyboard for selecting characters forming a text to be composed and for signaling the end of each word and of each line of said text, means communicating with said keyboard for assigning a character width to each character and normal word space on said keyboard as it is selected, a line length circuit communicating with said character width assigning means for accumulating the character widths in each line as the characters of said line are selected, said line length circuit being reset upon completion of each line of said text, a word space counter associated with said keyboard, said word space counter being incremented upon initiation of each word space and being reset upon completion of each line, a word length circuit communicating with said character width assigning means for accumulating the character widths in each word as the characters of said word are selected, said word length circuit being cleared upon initiation of each word space, means for adjusting the accumulated width measures in said line length circuit in accordance with the accumulated width measures in said word length circuit to restore said line length circuit to its condition prior to commencement of said errored word, means for deleting one unit from said word space counter upon adjustment of said line length counter and means for communicating information with respect to the accumulated character widths in said line length counter and the number of word spaces in said word space counter to a photoassembling apparatus whereby an operator may delete and correct a word of said text without deleting an entire line.

4. A photocomposing system in accordance with claim 3, wherein the character width of each character is assigned as a selected number of fixed width units.

5. Apparatus in accordance with claim 4 when said line length circuit comprises a sequential counter incremented by a number of units equal to the units assigned to each character as said character is selected and wherein said word length circuit comprises a memory unit interconnected with said counter, said memory unit being incremented in unison with said counter.

6. Apparatus in accordance with claim 5 wherein said adjusting means further includes a multivibrator activated by said operator for adjusting the number of units in said counter and simultaneously augmenting said memory until said memory reaches a selected state and a binary circuit for terminating operation of said multivibrator when said memory reaches said selected state.

* * * * *